United States Patent
Xiao et al.

(10) Patent No.: US 12,511,862 B2
(45) Date of Patent: Dec. 30, 2025

(54) TEMPLATE-BASED IMAGE PROCESSING FOR TARGET SEGMENTATION AND METROLOGY

(71) Applicant: Applied Materials, Inc., Santa Clara, CA (US)

(72) Inventors: Xinhuo Xiao, Hangzhou (CN); Stephanie W. Chen, Fremont, CA (US); Waheb Bishara, San Mateo, CA (US); Bin Lin, Hangzhou (CN)

(73) Assignee: Applied Materials, Inc., Santa Clara, CA (US)

( * ) Notice: Subject to any disclaimer, the term of this patent is extended or adjusted under 35 U.S.C. 154(b) by 440 days.

(21) Appl. No.: 17/793,021

(22) PCT Filed: Jan. 10, 2022

(86) PCT No.: PCT/CN2022/070956
§ 371 (c)(1),
(2) Date: Jul. 14, 2022

(87) PCT Pub. No.: WO2023/130432
PCT Pub. Date: Jul. 13, 2023

(65) Prior Publication Data
US 2023/0237762 A1    Jul. 27, 2023

(51) Int. Cl.
*G06V 10/26* (2022.01)
*G01N 21/95* (2006.01)
(Continued)

(52) U.S. Cl.
CPC ......... *G06V 10/26* (2022.01); *G01N 21/9501* (2013.01); *G06T 7/001* (2013.01);
(Continued)

(58) Field of Classification Search
None
See application file for complete search history.

(56) References Cited

U.S. PATENT DOCUMENTS

| | | | |
|---|---|---|---|
| 2003/0160163 A1* | 8/2003 | Wong | G03F 7/70683 250/237 R |
| 2009/0034831 A1* | 2/2009 | Amanullah | G01N 21/9501 382/145 |

(Continued)

FOREIGN PATENT DOCUMENTS

CN    112289726 A  *  1/2021  ........... G06K 9/6202

OTHER PUBLICATIONS

International Search Report and Written Opinion for International Application No. PCT/CN2022/070956, mailed Aug. 31, 2022, 6 Pages.

*Primary Examiner* — Akwasi M Sarpong
*Assistant Examiner* — Pawan Dhingra
(74) *Attorney, Agent, or Firm* — Lowenstein Sandler LLP

(57) ABSTRACT

One or more images of a portion of a wafer with fabricated devices are acquired using an imaging tool. A pattern of repeating features in an input image of a wafer is identified using various methods, such as correlation and clustering of neighboring vectors. A template is generated based on the found pattern of repeating features. The template is aligned with the acquired image to identify target locations. The target locations are then isolated from the original image for performing detailed metrology.

16 Claims, 9 Drawing Sheets

(51) Int. Cl.
  *G06T 7/00*      (2017.01)
  *G06T 7/11*      (2017.01)
  *G06T 7/60*      (2017.01)
  *G06V 10/762*    (2022.01)
  *G06V 10/764*    (2022.01)

(52) U.S. Cl.
  CPC ............... *G06T 7/11* (2017.01); *G06T 7/60* (2013.01); *G06V 10/762* (2022.01); *G06V 10/764* (2022.01); *G06T 2200/24* (2013.01); *G06T 2207/20021* (2013.01); *G06T 2207/20132* (2013.01); *G06T 2207/30148* (2013.01)

(56) References Cited

U.S. PATENT DOCUMENTS

| | | | | |
|---|---|---|---|---|
| 2009/0087103 | A1* | 4/2009 | Abe | G06V 10/7515 382/209 |
| 2013/0217154 | A1* | 8/2013 | Fukazawa | G03F 9/7026 356/237.5 |
| 2014/0307256 | A1* | 10/2014 | Amir | G01B 11/02 356/243.1 |
| 2015/0338745 | A1* | 11/2015 | Fukazawa | G01N 21/9501 356/369 |
| 2017/0200265 | A1* | 7/2017 | Bhaskar | G06T 7/0004 |

* cited by examiner

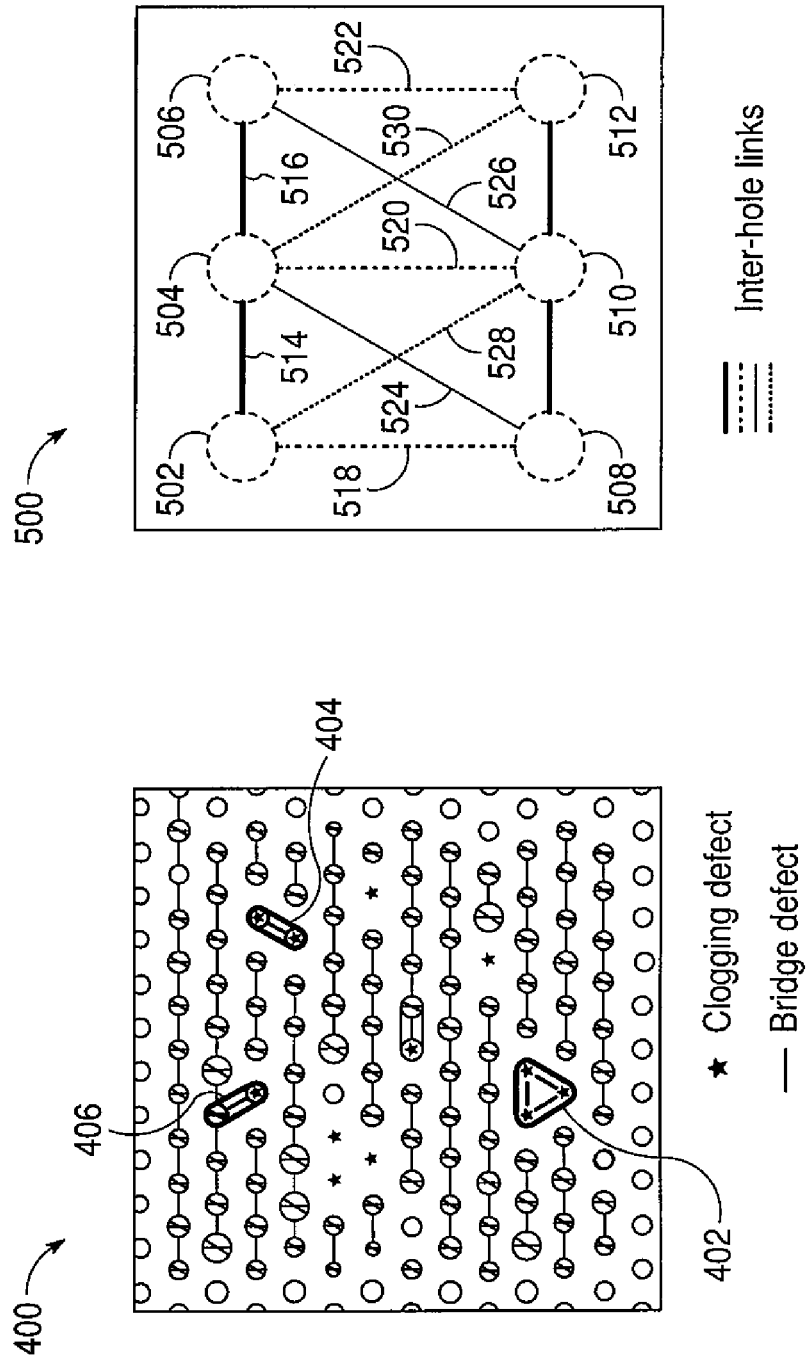

TEMPLATE-BASED IMAGE PROCESSING FOR TARGET SEGMENTATION AND METROLOGY

TECHNICAL FIELD

Embodiments of the disclosure relate generally to measuring fine features that appear as patterns in devices fabricated on a semiconductor wafer, and particularly to identify precise locations in an image of a wafer to perform metrology.

BACKGROUND

The manufacturing process of semiconductor integrated circuits requires high resolution measurements of fine features for accurate metrology. Metrology data is often used to tune process parameters to improve manufacturing yield and uniformity. Taking high-resolution images and measuring dimensions (including critical dimensions, CD) directly from the images is one way of producing metrology data. However, direct measurements are negatively impacted by noise, which can be the image noise inherent to a raw image, measurement noise (e.g., image artifact that is not present in the original imaged object but is introduced by the limitations of the imaging equipment), and/or other local artifacts (e.g., localized residue or debris, missing features, or imperfectly formed features).

Various image processing techniques are used to improve measurement accuracy, such as edge detection method or threshold method to extract measurement target from where metrology data is to be gathered. However, these methods cannot find if a feature is missing in a pattern due to defective fabrication. When the measured fine features appear in a repetitive pattern on the wafer, each feature may not be measured individually and a portion of the wafer may be sampled to collect metrology data. However, unguided sampling does not provide accurate visibility into the metrology of the entire area, and is prone to measurement noise. This disclosure proposes a method for obtaining metrology data using algorithmically generated templates, where the metrology is much more comprehensive and robust against noises.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Specifically, a method is disclosed comprising: obtaining one or more original images of an area of a wafer, wherein the wafer has a plurality of device features (e.g., holes, islands or other geometrical features) fabricated on it; creating, from the one or more original images or a known design pattern input by a user, an image template having an array of elements with a periodicity that mimics an identified pattern of repetition of the device features on the wafer; anchoring the image template on to an original image; dividing the original image into a plurality of segments; and, selecting one or more segments from the plurality of segments as target areas to perform metrology.

The one or more original images are acquired using an imaging tool, such as an SEM, a TEM, and optical imaging tool, and X-ray imaging tool or the like.

Creating the image template may further comprise: creating, from the one or more images, a binary image containing a plurality of blobs representing the device features; determining neighboring vectors between adjacent blobs of the plurality of blobs; and, classifying the neighboring vectors into a plurality of groups to identify the pattern of repetition of the device features on the wafer. Classifying the neighboring vectors may comprise using a clustering technique (such as K-means clustering) to determine the plurality of groups that the neighboring vectors belong to.

In as aspect of the disclosure, creating the image template may comprise: cropping a section of an original image to create a sub-image that has a first fraction of the height and a second faction the width of the original image; shifting the sub-image within the original image to a plurality of new positions; and, creating the image template based on finding a new position among the plurality of new positions where correspondence between the original image and the sub-image is the best.

The sub-image may be a half-image that has half the height and half the width of the original image, created by cropping a quadrant of the original image. The half-image may be shifted both horizontally and vertically within the original image.

BRIEF DESCRIPTION OF THE DRAWINGS

The present disclosure will be understood more fully from the detailed description given below and from the accompanying drawings of various embodiments of the disclosure.

FIG. 4 illustrates identifying various types of defects in an image with an array of holes, according to embodiments of the present disclosure.

FIG. 5 illustrates an example of measuring inter-hole links, according to embodiments of the present disclosure.

DETAILED DESCRIPTION

Figure 1:
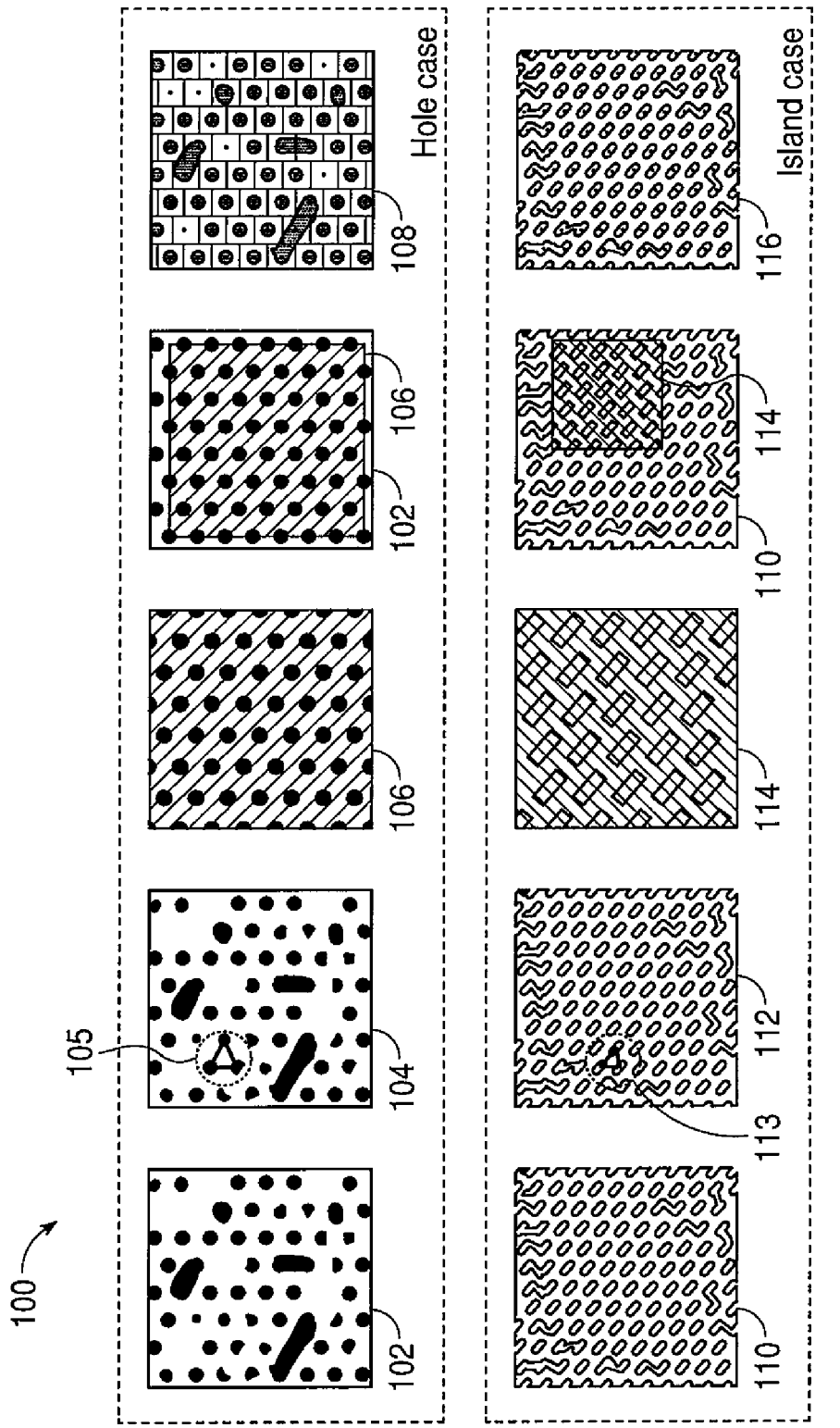
FIG. 1 illustrates basic steps for using a template-based process to locate device features (e.g., a memory hole or an island) to prepare a metrology target, according to embodiments of the present disclosure.

Embodiments of the present disclosure are directed to a novel approach for image measurements from segmented targets, where the segmented targets are obtained using algorithmically generated image templates. The disclosed approach is robust against high noise level present in the raw image or other types of image artifacts. The image artifacts can be introduced by the limitations of the imaging equipment, localized debris or residue, or other inherent characteristics of the device being imaged, such as an obscured feature in the device, or a missing feature in a pattern or features that are collapsed or adjacent features that are merged due to imperfect fabrication. This disclosure leverages identifying patterns of repetitive features found on a wafer to isolate one or more features in a segmented target that is obtained using image templates, so that meaningful metrology data can be found from the isolated feature(s).

One objective achieved by this disclosure is to produce metrology data for fine-featured electronic devices in a non-destructive way using images obtained from a variety of imaging tools, including, but not limited to electron beam (e-beam) imaging tool (e.g., scanning electron microscope (SEM)), optical imaging tools, X-ray-based imaging tools etc. The electronic devices may be advanced semiconductor devices formed on a wafer. The 3D features may have a lateral dimension in a range varying from a few nanometers to tens or hundreds of nanometers. Some semiconductor devices may have fine features not only with tight lateral dimension, but also with high aspect ratio (HAR). This disclosure is, however, not limited to any specific lateral dimension or any specific aspect ratio. Illustrative examples of device features being imaged include, but are not limited to, channel holes, slits, trenches, islands etc. Specific examples of high aspect ratio features include circular memory holes in 3D NAND memory devices. Those skilled in the art can extrapolate the application of the disclosed technique to any other geometry. Examples of other geometries include trenches such as those used for shallow trench isolation of transistors. The 3D features may be isolated structures or part of an array of similar features. In this disclosure, an array of similar features is first identified to generate image templates, and then using the templates a target is segmented for metrology.

Device features should be characterized well using detailed metrology to be able to tune process parameters. For example, as a process (such as an etching process or a deposition process) progresses, aspect ratio and different critical dimensions of the feature changes. As a particular illustration, in an etch process, the critical dimensions of a feature varies as processing time or other process parameters are tuned. Accurate characterization of device features enables effective tuning of the etch process parameters. Current approaches for device feature characterization use e-beam/optical/X-ray images along a vertical (or longitudinal) section, and/or transmission electron microscopy (TEM) images. These destructive imaging techniques usually provide only an image of a single planar section (longitudinal section) from which a limited number of device characterization metrics are obtained, which is unsuitable for high-volume manufacturing (HVM).

The present disclosure addresses these and other shortcomings of the current methods by using algorithms that generate image templates without having to destroy the wafer to expose a longitudinal cross section of a device feature to perform measurements. The image templates are generated based on repetition of certain features that creates a pattern. A raw image of the pattern can be segmented into a target containing an isolated feature from which metrology data is gathered reliably.

Advantages of the present approach include, but are not limited to, robustness to noise and image artifacts, and flexibility in segmenting metrology target even in a high-defectivity scenario. In other words, the present technique is robust enough to be tolerant against both noise and defects in a wafer.

FIG. 1 illustrates basic steps for using a template-based process to locate device features to prepare a metrology target, according to embodiments of the present disclosure. The top row of figures 100 are for one type of example features that are repetitive on a wafer, e.g., memory holes. The bottom row of figures 150 are for another type of example features that are repetitive on a wafer, e.g., islands. Persons skilled in the art would understand that the geometry of the feature does not limit the scope of the disclosure as long as the feature is repetitive, i.e. arranges in an array, mostly a two-dimensional array, but linear arrays are covered too.

In FIG. 1, an original image 102 is obtained from an SEM or other imaging tools. The image 102 has defects, for example missing holes, or two holes merged. From the original image 102, representative vectors (such as the vectors connecting the holes within the dashed outline 105, defining the image's repeating patterns) are calculated in the first step, as shown in 104. This is elaborated more with respect to FIG. 2. Those calculated vector are used to generate an image template, e.g., template 106, which is nothing but an idealized representation of a perfect array of holes whose pitch mimics the periodicity of the holes. The template 106 is then superimposed and anchored on the original image 102. A segmented image 108 (shown in detail in FIG. 3) is generated as a result, from which different measurements are obtained.

For the island case, the original image is 110. In the first step 112, representative vectors such as shown within 113 are identified in the image. A template 114 is then generated, which is superimposed on 110 as shown in the next diagram. As a result, segmented image 116 is created which is optimum for metrology. These are discussed in further detail in FIGS. 6 and 7.

Figure 2:
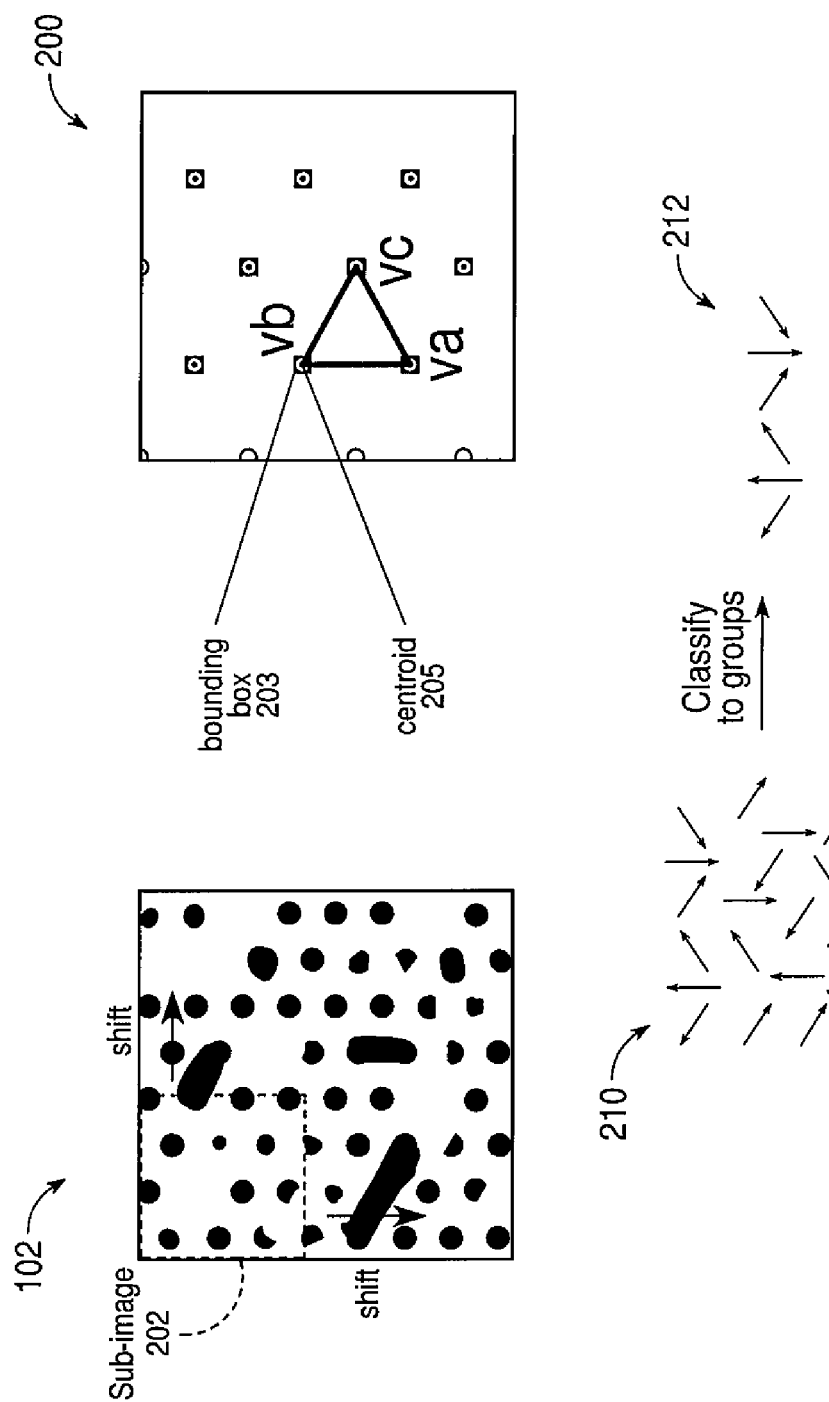
FIG. 2 illustrates how vectors are selected from an original image in order to create a template, according to embodiments of the present disclosure.

FIG. 2 illustrates details of how vectors are calculated from an original image to create a template, according to embodiments of the present disclosure. From the original image 102, a sub-image 202 is created. The sub-image can have a fraction of the height and width of the original image 102. For example, if the sub-image is a half-image, then the height of the sub-image would be half the height of the original image 102, and the width of the sub-image would be half the width of the original image 102.

The sub-image is shifted in both vertical and horizontal direction in case of a two-dimensional array (and in one direction in case of a linear array), and the correspondence between the original image and sub-image is given a score per shifted position. The shift amounts that yield high correspondence are labeled in a binary image (200). Correlation is one of the techniques to identify where this correspondence is the best.

Figure 2A:
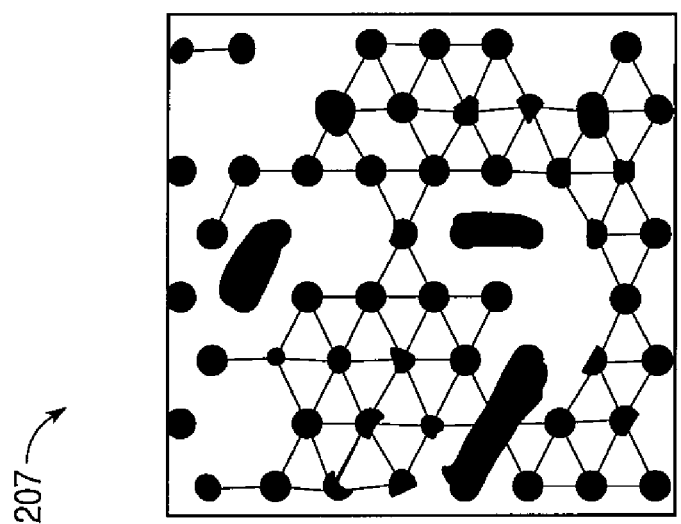
FIG. 2A illustrates an alternative to correlation method involving binary centroids and neighboring links, according to embodiments of the present disclosure.

All the different vectors between the neighboring binary blobs in 200 are grouped into a few clusters, as shown in 212. This can be done by using known clustering techniques, e.g. K-means clustering technique. The representative vectors of each cluster are identified and used to create a perfect pattern free of noise or defects. Alternatively, the binary blobs and centroids could come from greyscale thresholding in original image. Each of the blobs would have a centroid 205 within a bounding box 203 and vectors 210 would be between neighboring centroids. This alternative method is further illustrated in 207 in FIG. 2A.

Figure 3:
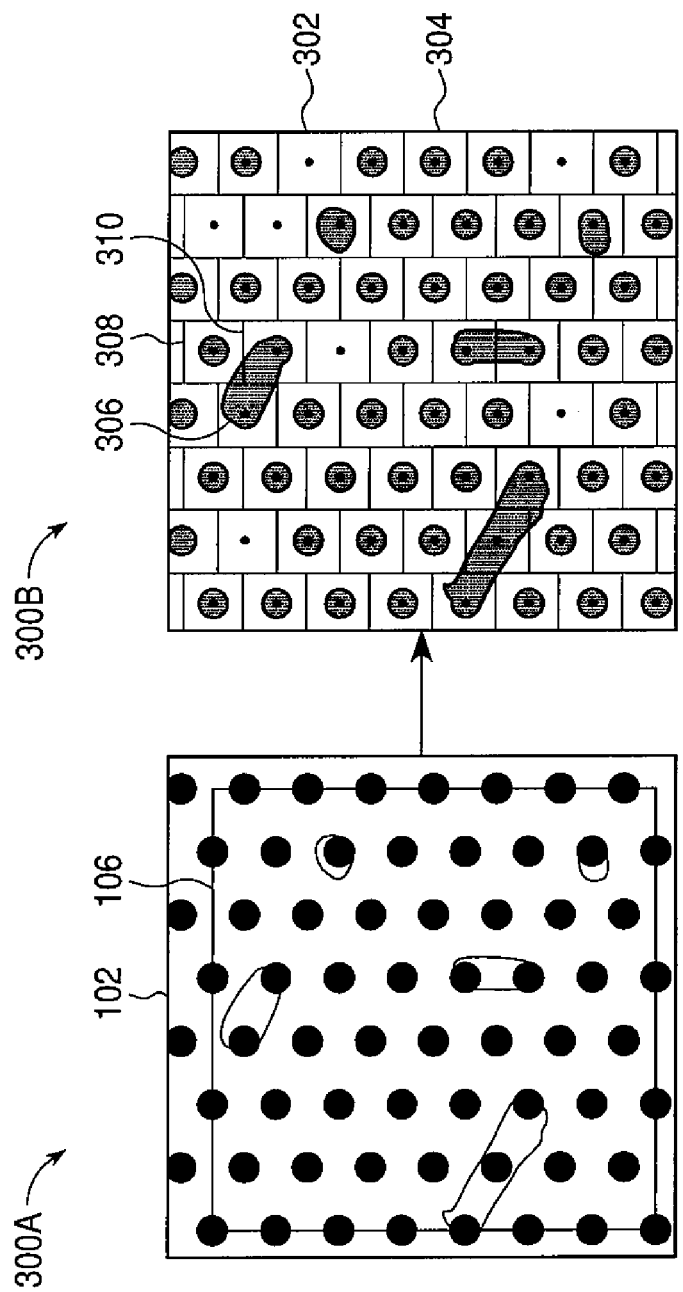
FIG. 3 illustrates a template superimposed on the original image to eventually segment the image into a plurality of possible metrology target areas, according to an embodiment of the present disclosure.

FIG. 3 illustrates a template superimposed and anchored on the original image to eventually segment the image into a plurality of possible metrology target areas, according to an embodiment of the present disclosure. In particular, once the template 106 is created, it is anchored to the original image 102, as shown in 300A. The original image, modified by the superimposed template, is then segmented into target areas for metrology, such as 302, 304, 308, 310 etc. Each segment size may be determined based on the calculated vectors. Certain segments may have no holes, for example a missing hole in segment 302. Certain other segments may have a hole, that is merged with another hole in another segment, such as hole 306 in one segment merged with the hole in segment 310.

FIG. 4 illustrates a modified image 400 created after template based segmentation that helps in identifying and classifying various types of defects in an image with an array of holes, according to embodiments of the present disclosure. For example, two of the example types of defects can be clogging defects and bridge defect. The contour 406 shows a clogging defect (marked by an star symbol), contour 404 shows two clogging defects, and contour 402 shows holes that are fused and bridged (shown by the lines between the star symbols).

FIG. 5 illustrates an example of measuring inter-hole links, according to embodiments of the present disclosure. This can be a segment with holes 502, 504, 506, 508, 510 and 512. Different types of inter-hole links are shown with different styles of lines. The first category of inter-link distances 514 and 516, the second category of inter-link distances 518, 520 and 522, the third category of inter-link distances 524 and 526, and the fourth category of inter-link distances 528 and 530 all provide different types of metrology insights.

Figure 6:
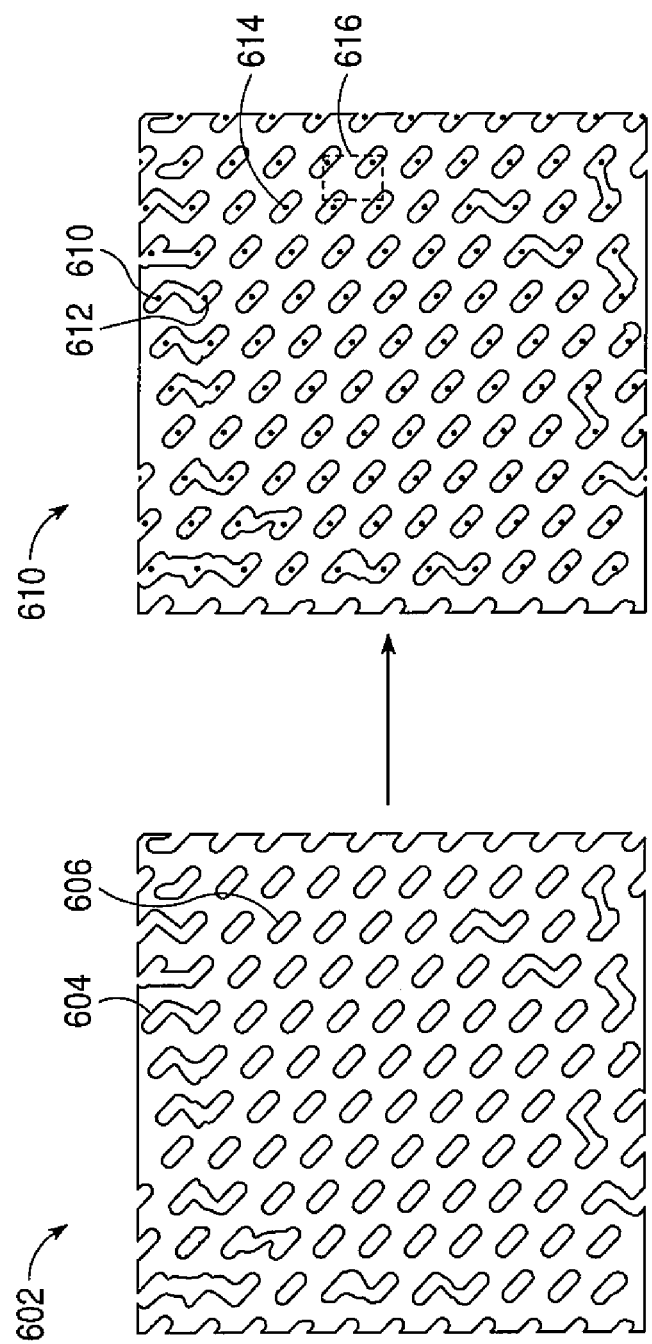
FIG. 6 illustrates template-based segmentation in an image with an array of islands, according to embodiments of the present disclosure.

FIG. 6 illustrates template-based segmentation in an image with an array of islands, according to embodiments of the present disclosure. Original image 602 has an array of individual islands (e.g., island 606), which in ideal case should be isolated from the neighboring islands. But some islands, such as 604 is merged with a neighboring island. After a template-based segmentation, the segmented image 610 is created. No defects are found in a segment, for example segment 616, and that inter-island distance may be measured. But in another segment, the distance between the centroids 610 and 612 of two merged islands may be measured for additional metrology insight about how to tweak a process.

Figure 7:
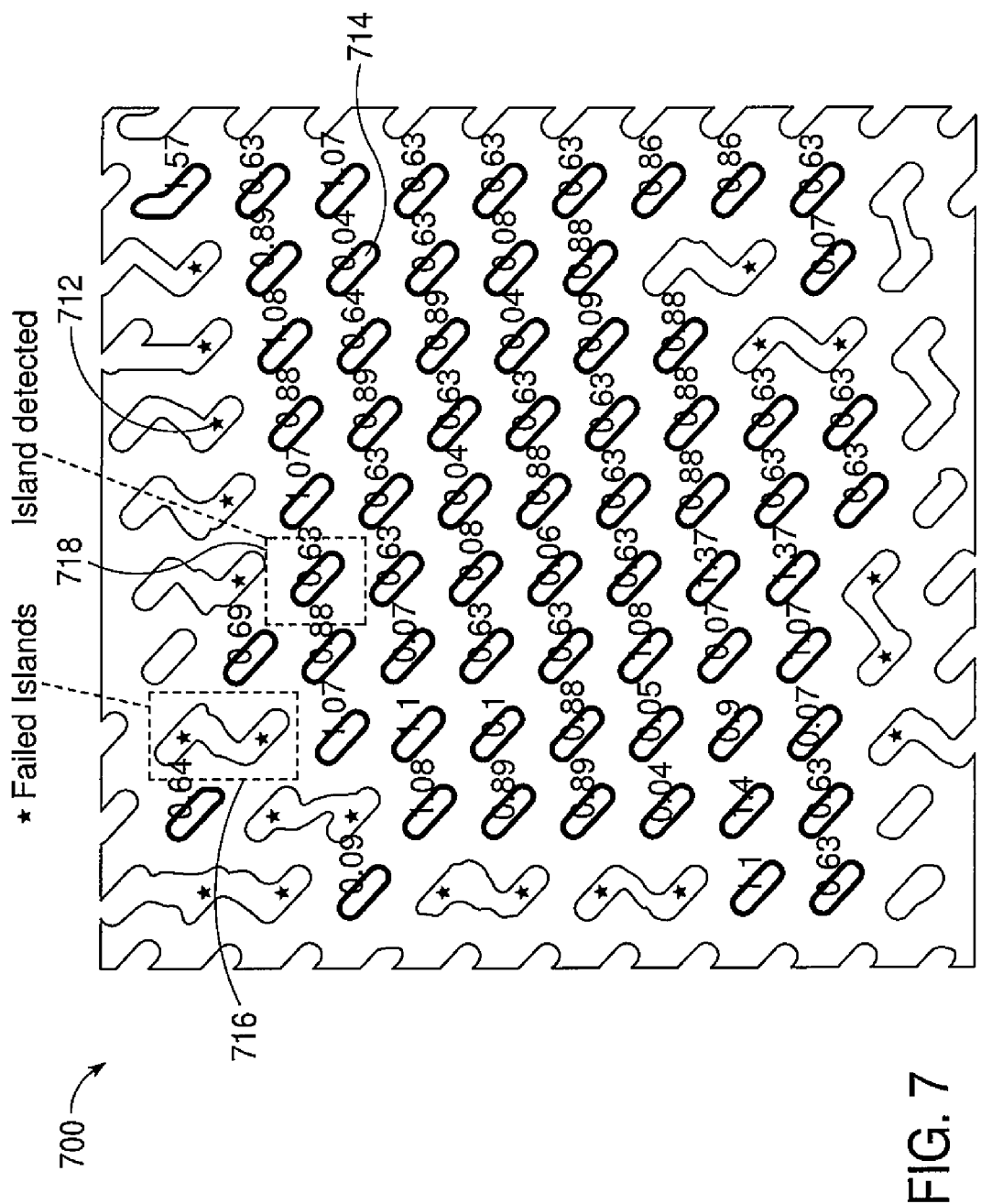
FIG. 7 illustrates an example of post-segmentation measurements for the array of islands, according to an embodiment of the present disclosure.

FIG. 7 illustrates an example of post-segmentation measurements for the array of islands comprising individual islands like 714, according to an embodiment of the present disclosure. Types of defects are categorized. The star symbols indicate failed islands. For example segment 716 shows two failed islands, while segment 718 shows an isolated island. The numerical measurements superimposed on the segmented image 700 are examples of inter-island distances, which are measured during metrology.

In summary, template-based segmentation makes it far more effective to perform various inter-feature measurements when the feature appears in a repetitive manner. Traditional techniques like threshold-based segmentation may fail to detect certain types of defects (e.g., clogging), or multiple merged features may be misinterpreted as just one feature.

Figure 8:
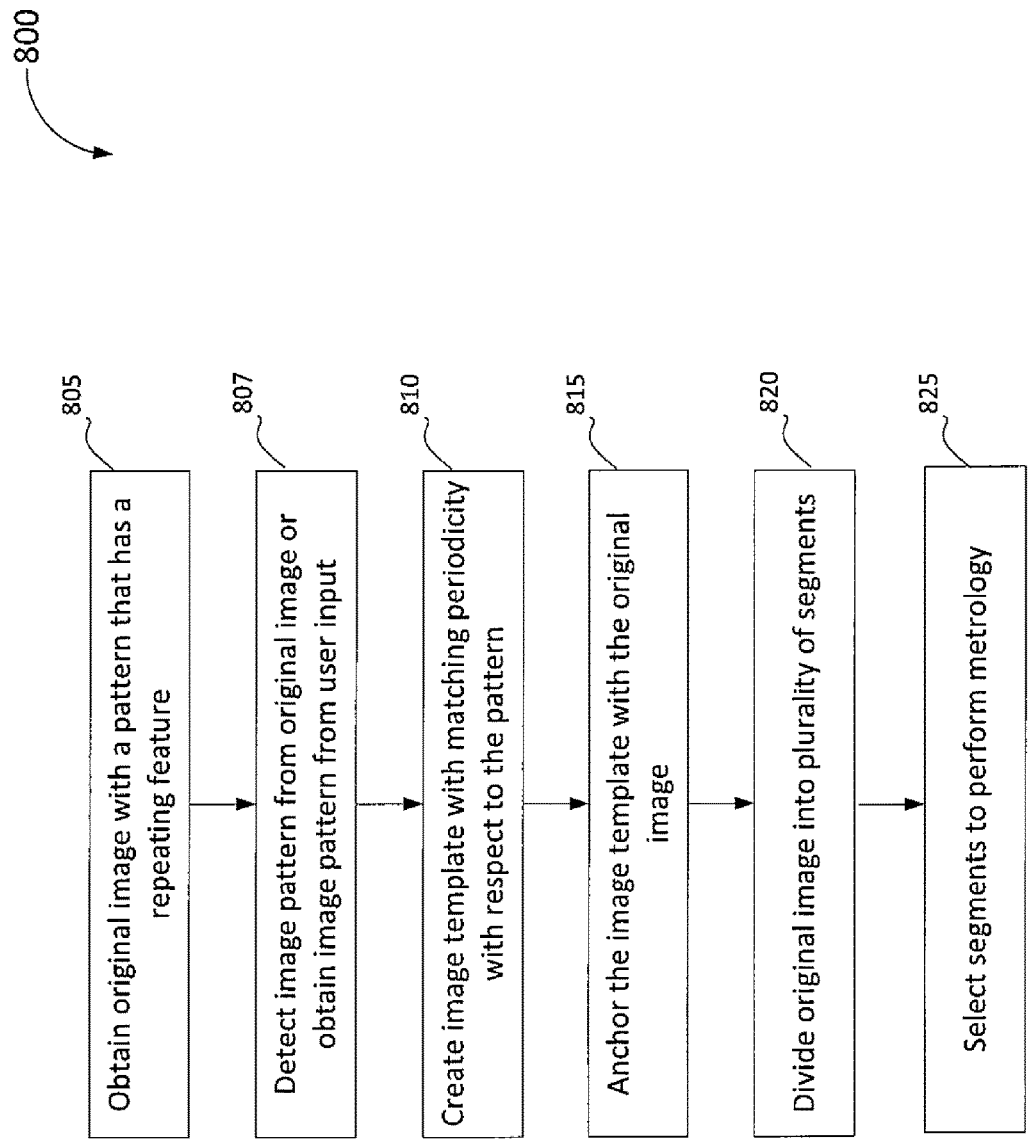
FIG. 8 shows a flowchart describing an example method of template-based image processing for metrology, according to an embodiment of the present disclosure.

FIG. 8 is a flow diagram of an example method 800 of template-based metrology data generation, in accordance with some embodiments of the present disclosure. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes in method 800 or other methods described herein with illustrative flowcharts can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In method 800, at block 805, one or more original images of an area of a wafer are obtained. The wafer has a plurality of device features fabricated on it, which are imaged by an image acquiring tool, such as a scanning electron micrograph (SEM) tool, a transmission electron micrograph (TEM) tool, an optical imaging tool, an X-ray imaging tool or the like. The scope of the disclosure does not depend on what imaging tool is used.

At block 807, an image pattern is detected from the original image. Alternatively, at block 807, the pattern can be obtained from user input of a design pattern.

At block 810, an image template is created from the one or more original images or the user input of the design pattern. The image template comprises an array of elements with a periodicity that mimics an identified pattern of repetition of the device features on the wafer, as elaborated above.

At block 815, the image template is anchored on to an original image. Note that the original image is not perfect, i.e. some device features in the array may be missing, or some may be fused together, but the template is an idealized version of what the array should have looked like if fabricated perfectly and if there were no imaging artifacts creating noise.

At block 820, the original image is divided into a plurality of segments. Each of those segments would have one or more of the device features to be measured. In other words, each segment is a possible metrology target.

At block 825, one or more segments from those plurality of segments are chosen as target areas to perform detailed metrology. The metrology may mean further image processing using numerical optimization techniques or other more conventional techniques, for example, edge detection technique.

Figure 9:
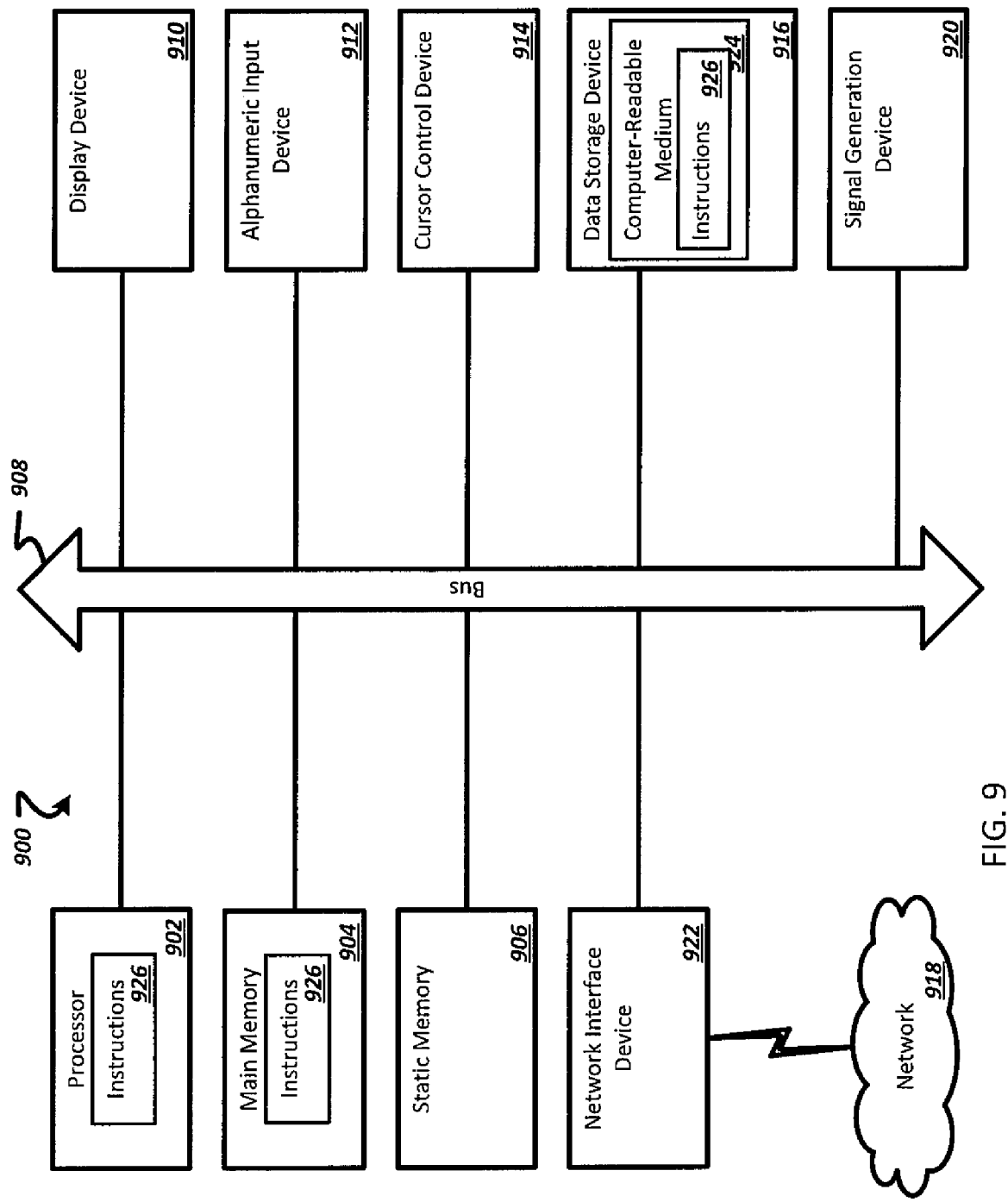
FIG. 9 illustrates an example computer system within which a set of instructions for performing any one or more of the methodologies discussed herein may be executed.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a web appliance, a server, a network router, a switch or bridge, or any machine capable of executing a set of instructions (sequential or otherwise) that specify actions to be taken by that machine. Further, while a single machine is illustrated, the term "machine"

shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) etc.), a static memory 906 (e.g., flash memory, static random access memory (SRAM), etc.), and a data storage device 916, which communicate with each other via a bus 908.

Processing device 902 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute instructions for performing the operations and steps discussed herein.

The computer system 900 may further include a network interface device 922 to communicate over the network 918. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse or a touch pad),), a signal generation device 920 (e.g., a speaker), a graphics processing unit (not shown), video processing unit (not shown), and audio processing unit (not shown).

The data storage device 916 may include a machine-readable storage medium 924 (also known as a computer-readable medium) on which is stored one or more sets of instructions or software embodying any one or more of the methodologies or functions described herein. The instructions may also reside, completely or at least partially, within the main memory 904 and/or within the processing device 902 during execution thereof by the computer system 900, the main memory 904 and the processing device 902 also constituting machine-readable storage media.

In one implementation, the instructions include instructions to implement functionality corresponding to a height difference determination. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "obtaining" or "associating" or "executing" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A method for performing metrology on a wafer, the method comprising:
    acquiring, using an imaging tool, one or more original images of an area of the wafer, wherein the wafer has a plurality of device features fabricated on it;
    creating, from the one or more original images or from a user input of a design pattern, an image template having an array of elements with a periodicity that mimics an identified pattern of repetition of the device features on the wafer, wherein creating the image template further comprises:
        creating, from the one or more original images, a binary image containing a plurality of blobs representing the device features;
        determining neighboring vectors between adjacent blobs of the plurality of blobs; and
        classifying the neighboring vectors into a plurality of groups to identify the pattern of repetition of the device features on the wafer;
    anchoring the image template on to an original image;
    dividing the original image into a plurality of segments;
    selecting one or more segments from the plurality of segments as target areas to perform metrology;
    performing metrology in the selected target areas to produce metrology data that is free of noise and image artifacts; and
    tuning process parameters using the metrology data to improve manufacturing yield and uniformity of the wafer.

2. The method of claim 1, wherein classifying the neighboring vectors comprises:
    using a clustering technique to determine the plurality of groups that the neighboring vectors belong to.

3. The method of claim 2, wherein the clustering technique in K-means clustering.

4. The method of claim 1, wherein creating the image template comprises:
    cropping a section of an original image to create a sub-image that has a first fraction of a height of the original image and a second faction of a width of the original image;
    shifting the sub-image within the original image to a plurality of new positions; and
    creating the image template based on finding a new position among the plurality of new positions where correspondence between the original image and the sub-image is the best.

5. The method of claim 4, wherein the sub-image comprises a half-image that has half the height of the original image and half the width of the original image.

6. The method of claim 5, wherein the half-image is created by cropping a quadrant of the original image.

7. The method of claim 6, wherein the half-image is shifted both horizontally and vertically within the original image.

8. The method of claim 1, wherein creating the binary image comprises:
    using greyscale thresholding technique to create bounding boxes and centroids at locations where device features are identified.

9. The method of claim 1, wherein the device features comprise holes or islands.

10. The method of claim 9, wherein each of the plurality of segments can have one or more of the device features.

11. A non-transitory machine-readable storage medium storing instructions which, when executed, cause a processing device to perform operations for performing metrology on a wafer, the operations comprising:
    acquiring, using an imaging tool, one or more original images of an area of the wafer, wherein the wafer has a plurality of device features fabricated on it;
    creating, from the one or more original images or from a user input of a design pattern, an image template having an array of elements with a periodicity that mimics an identified pattern of repetition of the device features on the wafer, wherein creating the image template further comprises:
        creating, from the one or more original images, a binary image containing a plurality of blobs representing the device features;
        determining neighboring vectors between adjacent blobs of the plurality of blobs; and
        classifying the neighboring vectors into a plurality of groups to identify the pattern of repetition of the device features on the wafer;
    anchoring the image template on to an original image;
    dividing the original image into a plurality of segments;
    selecting one or more segments from the plurality of segments as target areas to perform metrology;
    performing metrology in the selected target areas to produce metrology data that is free of noise and image artifacts; and
    tuning process parameters using the metrology data to improve manufacturing yield and uniformity of the wafer.

12. The non-transitory machine-readable storage medium of claim 11, wherein the imaging tool is a scanning electron micrograph, a transmission electron micrograph, an optical imaging tool, or an X-ray imaging tool.

13. The non-transitory machine-readable storage medium of claim 11, wherein classifying the neighboring vectors comprises:
    using a clustering technique to determine the plurality of groups that the neighboring vectors belong to.

14. The non-transitory machine-readable storage medium of claim 13, wherein the clustering technique in K-means clustering.

15. The non-transitory machine-readable storage medium of claim 11, wherein creating the image template comprises:
    cropping a section of an original image to create a sub-image that has a first fraction of a height of the original image and a second faction of a width of the original image;
    shifting the sub-image within the original image to a plurality of new positions; and
    creating the image template based on finding a new position among the plurality of new positions where correspondence between the original image and the sub-image is the best.

16. The non-transitory machine-readable storage medium of claim 15, wherein the sub-image comprises a half-image that has half the height and half the width of the original image, and the sub-image is shifted in vertical and horizontal directions.

* * * * *